United States Patent [19]

Sakai et al.

[11] Patent Number: 4,838,836
[45] Date of Patent: Jun. 13, 1989

[54] CONTROL VALVE FOR A CONTINUOUSLY VARIABLE TRANSMISSION

[75] Inventors: Yasuhito Sakai; Yoichi Iijima, both of Tokyo, Japan

[73] Assignee: Fuji Jukogyo Kabushiki Kaisha, Tokyo, Japan

[21] Appl. No.: 144,309

[22] Filed: Jan. 14, 1988

[30] Foreign Application Priority Data

Jan. 14, 1987 [JP] Japan .................. 62-007298

[51] Int. Cl.$^4$ ............................. F16H 11/02
[52] U.S. Cl. .......................... 474/28; 74/867; 474/18
[58] Field of Search ............ 474/18, 28, 70, 11, 474/12, 17, 69; 74/863–865, 867–869

[56] References Cited

U.S. PATENT DOCUMENTS

| 4,534,243 | 8/1985 | Yokoyama et al. ........... 474/28 X |
| 4,557,706 | 12/1985 | Tanaka et al. ............... 474/18 X |

FOREIGN PATENT DOCUMENTS 3607270 9/1986 Fed. Rep. of Germany .

Primary Examiner—Thuy M. Bui
Attorney, Agent, or Firm—Martin A. Farber

[57] ABSTRACT

A control valve has ports and a spool which has lands and an annular groove between the lands. The land has a plurality of hollow portions at a circumferential edge portion adjacent the annular groove so as to gradually increase the opening area of one of the ports.

10 Claims, 5 Drawing Sheets

CONTROL VALVE FOR A CONTINUOUSLY VARIABLE TRANSMISSION

BACKGROUND OF THE INVENTION

The present invention relates to a control valve for a continuously variable belt-drive automatic transmission for a motor vehicle, and more particularly to a transmission ratio control valve for controlling upshifting and downshifting of the transmission.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to upshift and downshift the transmission in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output of the engine.

The spool in the transmission ratio control valve is shifted in accordance with a relationship between spring force responsive to a depression of an accelerator pedal of the vehicle and pitot pressure responsive to the engine speed. The spool is shifted to an oil supply position for upshifting the transmission and an oil drain position for downshifting the transmission, and stopped at a position where the spring force and the pitot pressure balance with each other.

The flow rate of supply oil or drain oil is decided in accordance with changing rate of an opening area of a supply port or a drain port, so that the transmission ratio changing speed at upshifting or downshifting is determined.

If the transmission ratio changing rate is too high for the control of the transmission ratio, overshooting of the control operation will occur because of the delay of the control operation. On the other hand, if the transmission ratio changing rate is slow, the shifting operation of the transmission is delayed.

Further, the pressure in the chamber of the drive pulley is set to have a level, for example, half of that of the line pressure. Thus, the conditions for supplying a high line pressure at upshifting are different from the conditions for draining a low pressure at downshifting. Such a difference between the conditions also affects the transmission ratio changing rate.

German Patent Application Laid-Open DE-OS 3607270 discloses a control valve in which a spool mounted in a valve body has a land corresponding to ports which are communicated with a chamber of a drive pulley for controlling the amount of supply or drain oil. The land has tapered portions formed on opposite circumferential edge portions thereof, thereby moderately changing the opening degree of the port.

However, in such a structure, the spool becomes longer by the length of the tapered portions compared with a spool without a tapered portion. Further, in order to reduce the changing rate of opening area, the tapered portion must be formed at a very small angle. Therefore, it is difficult to manufacture tapered portions with accuracy. In addition, the space between the tapered portion and the inside wall of the valve body is liable to be clogged with dust and chips.

SUMMARY OF THE INVENTION

An object of the present invention is to provide a control valve which may eliminate the above-described disadvantages.

Another object of the present invention is to provide a transmission control valve having a spool with a simple structure for providing an appropriate transmission ratio changing rate.

The other objects and features of this invention will become understood from the following description with reference to the accompanying drawings.

BRIEF DESCRIPTION OF DRAWINGS

FIG. 4b is a graph showing an opening area characteristic of FIG. 4a;

FIG. 5b is a graph showing an opening area characteristic of FIG. 5a;

FIG. 6c a graph showing an opening area characteristic of FIG. 6a.

DETAILED DESCRIPTION OF THE PREFERRED EMBODIMENT

Figure 1:
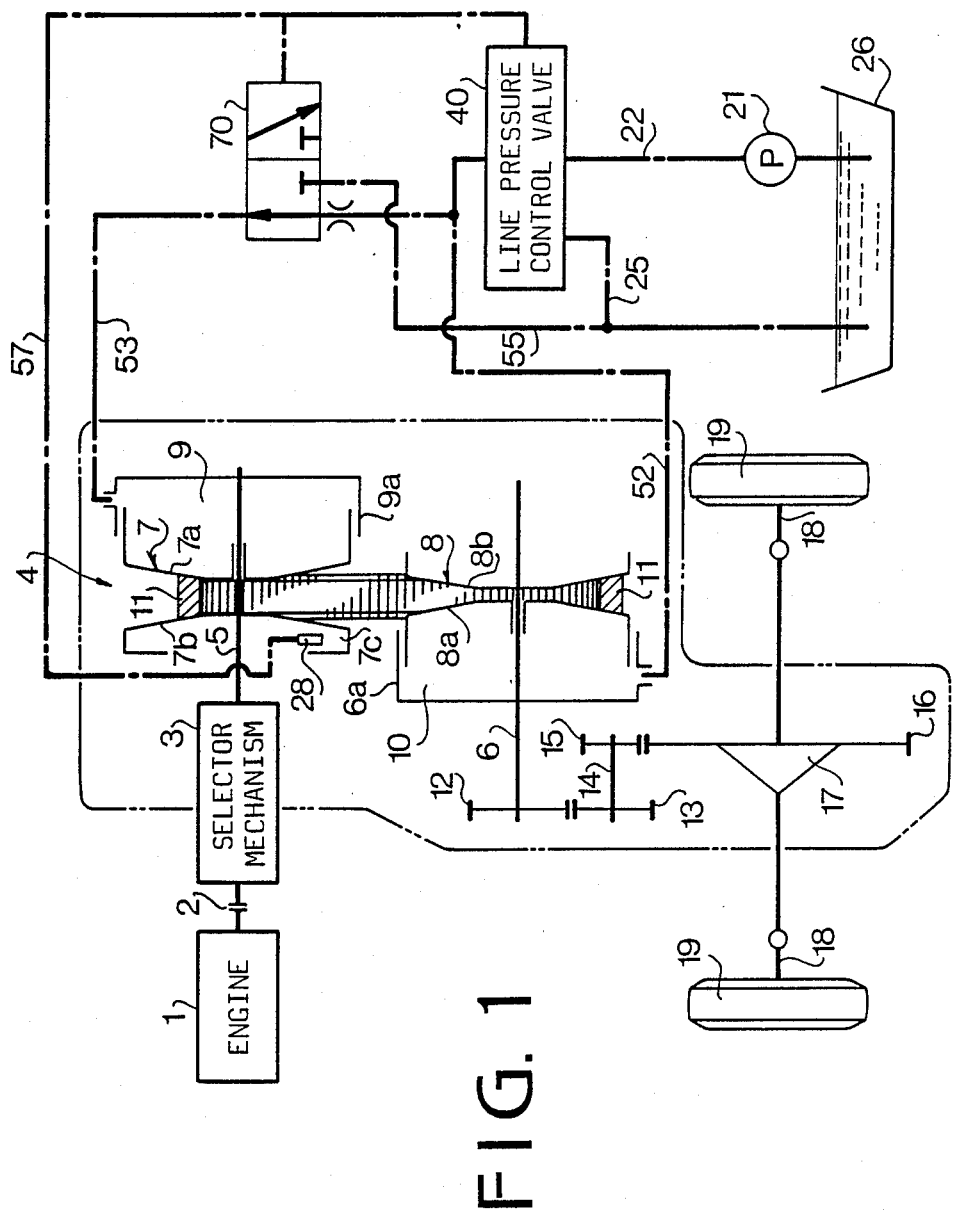
FIG. 1 is a schematic illustration of a continuously variable belt-drive transmission.
Figure 2:
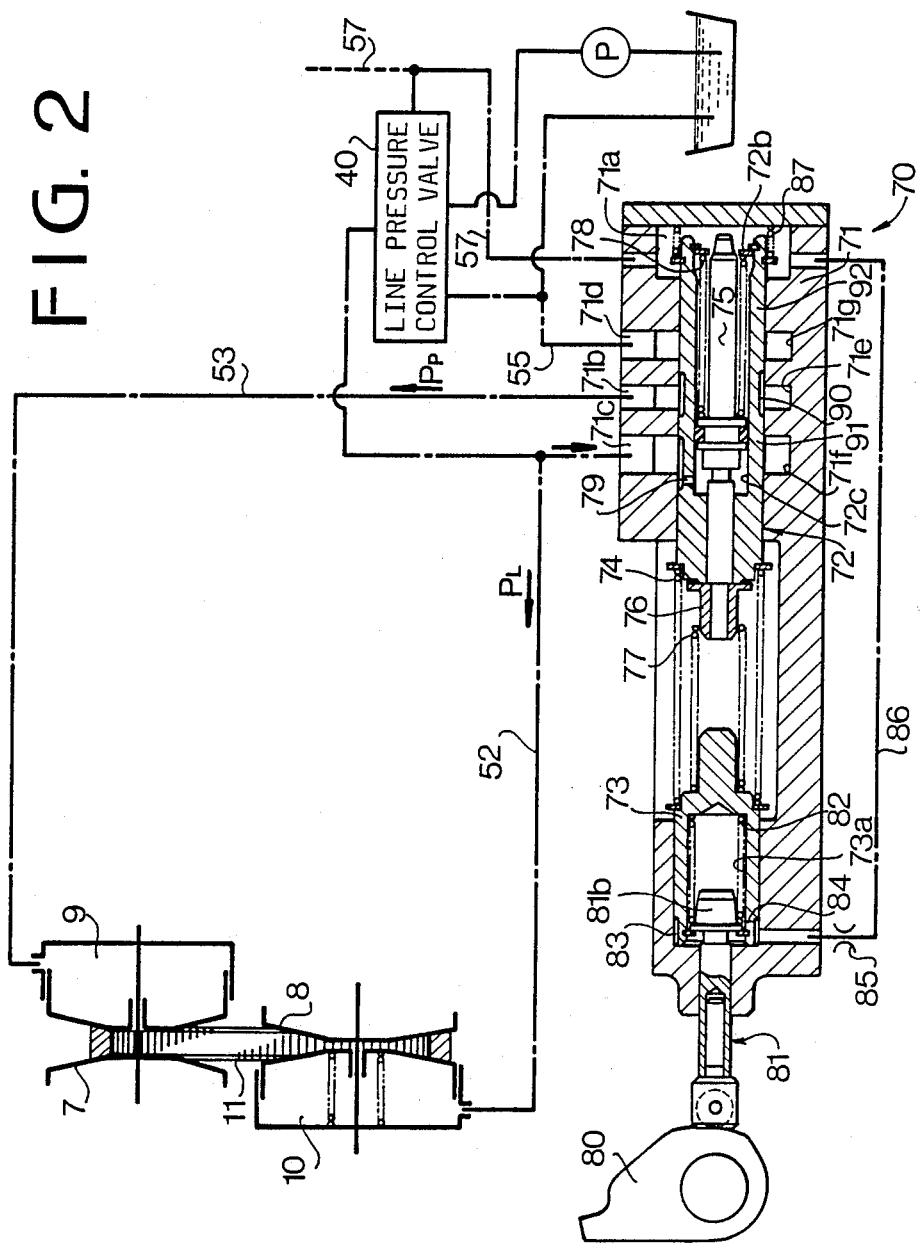
FIG. 2 is a schematic diagram of a transmission ratio control valve.

Referring to FIG. 1, a motor vehicle is provided with an engine 1 and an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with, the main shaft 5 and an axially movable conical disc 7a is axially slidably mounted on the main shaft 5. The movable conical disc 7a also slides in a cylinder 9a formed on the main shaft 5 to provide a servo device.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

A chamber 9 is formed between the axially movable disc 7a and the cylinder 9a of the drive pulley 7. The chamber 9 is supplied with pressurized oil by an oil pump 21 from an oil reservoir 26 passing through a passage 22, a line pressure control valve 40, a transmission ratio control valve 70, and a passage 53. A chamber 10 formed between the movable disc 8a and cylinder 6a of driven pulley 8 is applied with pressurized oil through a passage 52 from the line pressure control valve 40. The passage 52 is also communicated with the transmission ratio control valve 70. The movable conical disc 7a of the drive pulley 7 is so designed that the pressure receiving area thereof is larger than that of movable conical disc 8a of the driven pulley 8.

Oil flows back to the oil reservoir 26 through drain passages 25 and 55 which are in communication with the valves 40 and 70, respectively. The drive pulley 7 has an annular groove 7c and a rotation speed sensor 28 in the form of a pitot tube is provided for detecting the pressure of the oil in the groove that is the speed of the main shaft 5 which varies in dependency on the engine speed. The pitot pressure produced by the rotation speed sensor 28 is applied to an end of each of the valves 40 and 70 through a passage 57.

The transmission ratio control valve 70 comprises a valve body 71, a spool 72 is slidable provided in the valve body 71, an operating plunger 73, and a spring 74 provide between the spool 72 and the plunger 73. A chamber 71a is communicated with a passage 57 to be applied with the pitot pressure. The control valve 70 further comprises an annular groove 71e for a port 71b communicated with the groove 71f for a port 71c communicated with the passage 52, and an annular groove 71g for a port 71d communicated with a drain passage 55. An annular groove 90 is formed on the spool 72 so as to communicate the ports 71b and 71a or 71b and 71d for supplying or discharging line pressure to or from the chamber 9 in dependency on the position of the spool 72.

A regulator plunger 75 is slidably provided in an axial cavity 72c in the spool 72. A regulator spring 77 is provided between the operating plunger 73 and a retainer 76 securely mounted on a projecting end of the regulator plunger 75. A spring 78 is provided between a flange of the plunger 75 and a retainer 72b of the spool 72. The force of the regulator spring 77 is determined by the projecting extent of the plunger 75 from the spool 72 and the position of the plunger 75 is dependent on the line pressure at the port 71c which is supplied to the inside of the spool 72 through a small aperture 79.

The plunger 73 is slidably mounted in the valve body 71 and has an axial cavity 73a. A rod 81 is axially slidably mounted in the valve body 71, and a flange 81b of the rod 81 is slidably engaged with the wall of the cavity 73a. A small spring 82 is provided between the flange 81b and the plunger 73, and the flange 81b engages with a stopper 83 secured to the plunger 73. The cavity 73a is applied with the pitot pressure through a port 84 and a passage 86 having an orifice 85 and communicated with the chamber 71a. A spring 87 is provided between an end of the spool 72 and the valve body 71 to adjust the load on the spring 82. An end of the rod 81 engages with a cam 80 which is operatively connected to an accelerator pedal of the vehicle so as to be rotated in dependency on the depression of the pedal.

When the spool 72 is moved by the pitot pressure to communicate the port 71b with port 71c, the line pressure is applied to the chamber 9 of the drive pulley 7 to upshift the transmission. On the other hand, when the port 71b communicates with the port 71d, the chamber 9 is drained to downshift the transmission. The transmission ratio is determined by the balance between the pitot pressure and the force of the springs 74, 77.

At a stop condition of the vehicle, the line pressure is at the highest value, and the plunger 75 is located at a right end position, and the force of the spring 77 becomes zero. When the transmission starts to upshift, the line pressure begins to decrease, thereby increasing the force of the spring 77. As the engine speed rises, the transmission is upshifted.

Figure 3A:
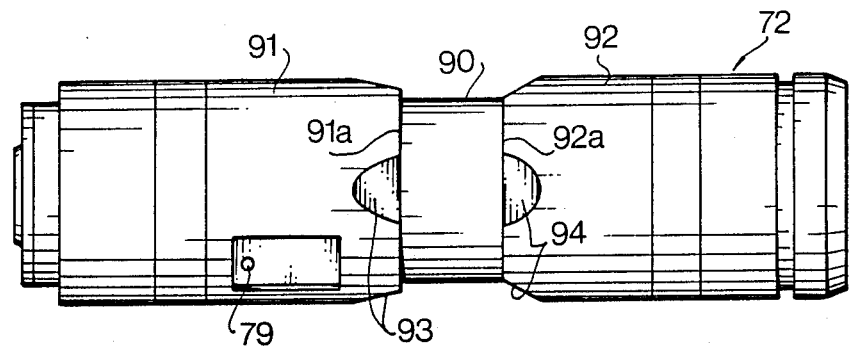
FIG. 3a is a side view of a spool mounted in the transmission ratio control valve.
Figure 3B:
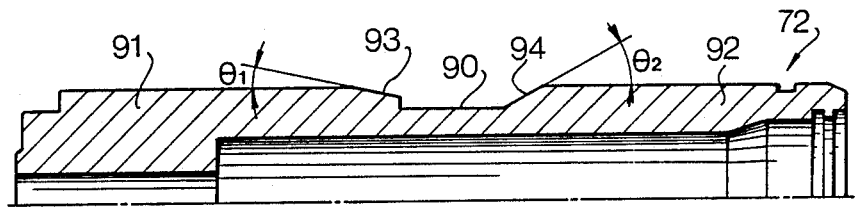
FIG. 3b is a part of a sectional view of the spool.

Referring to FIGS. 3a and 3b, the spool 72 has a land 91 for the supply port 71c and a land 92 for the drain port 71d. An annular groove 90 is formed between the lands 91 and 92. A circumferential edge portion 91a of land 91 adjacent the groove 90 is obliquely cut away at four positions at an angular interval of 90° to form four oblique planes 93. Thus, partial retracted peripheral portions are formed on the edge 91a. The land 92 also has four oblique planes 94 formed on a circumferential edge portion 92a corresponding to the oblique portions 93.

As shown in FIG. 3b, an oblique angle $\theta 1$ of the oblique plane 93 is set to be smaller than an oblique angle $\theta 2$ of the oblique plane 94 ($\theta 1 < \theta 2$).

Figure 3C:
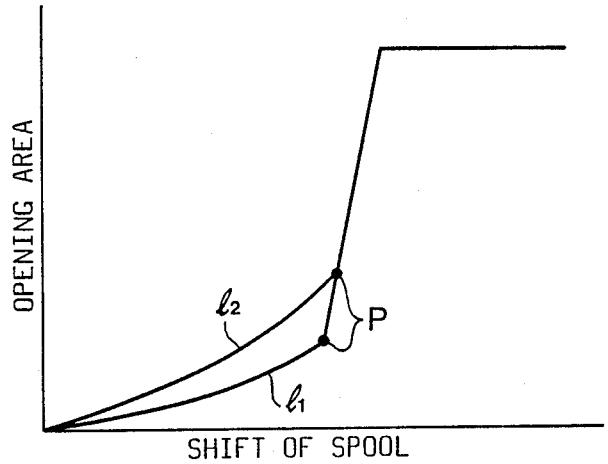
FIG. 3c is a graph showing an opening area characteristic of a port re by the spool.

Accordingly, as shown in FIG. 3c, characteristics of a changing rate of opening area l1 and l2 are very small at an initial period, while oblique planes 93 and 94 face the ports 71c and 71d and rapidly increase at and after an opening point P where the groove 90 opens to port 71c or 71d.

Describing the operation, in the transmission ratio control valve 70, force of the spring 74 or springs 74 and 77 by the compression of the cam 80 corresponding to the throttle valve opening degree applied to the spool 72 at an end portion thereof. Further, the spool 72 is applied with the pitot pressure responsive to the engine speed in the port 71a. When the pitot pressure and spring force are balanced, the spool 72 is balanced in a neutral position to close ports 71c and 71d by the lands 91 and 92, respectively. When the force of the springs reduces or the pitot pressure is increased, the spool 72 is shifted to the left. The land 91 is moved to open the port 71c by oblique planes 93. The oil is supplied to the chamber 9 through the passage 53 to start upshifting of the transmission. Although the line pressure is high, a changing rate of the opening area for the port 71c is small as shown by the l1 of FIG. 3c. Since the flow rate of the oil is restricted, the transmission is slowly upshifted at a low transmission ratio changing rate without shock or overshooting. After that, the groove 90 opens to the port 71c for supplying a large amount of oil to the chamber 9, so that the transmission ratio changing rate increases, thereby quickly upshifting the transmission to a desired transmission ratio.

When the force of the springs increases or the pitot pressure decreases, the spool 72 is shifted to the right. The oblique planes 94 face the port 71d so that the chamber 9 of the drive pulley 7 is drained to start downshifting the transmission. In this state, a level of the pressure in the chamber 9 is lower than a predetermined value of the line pressure, having characteristic as shown by the line 12 of FIG. 3c. Thus, the drain oil is restricted, thereby slowly downshifting the transmission. When the groove 90 opens to the port 71d, the transmission is perfectly downshifted to a desired transmission ratio.

Figure 4A:
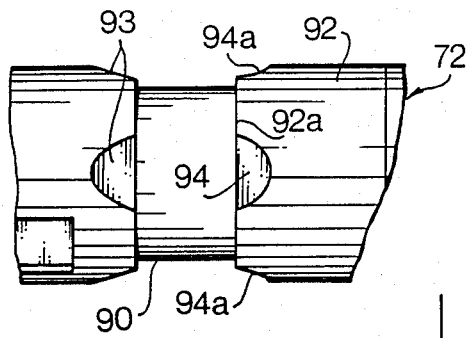
FIG. 4a is a side view showing a part of second embodiment the spool of the present invention.
Figure 4B:
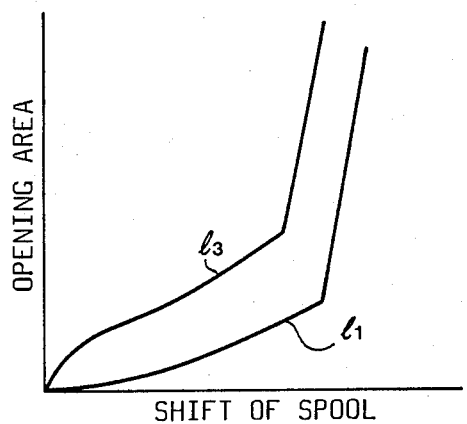

FIGS. 4a and 4b show another embodiment of the spool 72 of the present invention. The land 92 for the drain port 71d has two oblique planes 94 which are formed on diametrically opposite positions of the edge 92a and has two diametrically opposite indented oblique planes 94a. The oblique plane 94a is indented concavely in a sectional view along an axial line as shown in FIG. 4a. As shown by a line 13 in FIG. 4b, characteristic for the changing rate of the opening area for the port 71d is larger at the initial period compared with line 12 of FIG. 3c. Accordingly, a large amount of oil is drained at the start of the downshift, thereby eliminating delay of timing at the downshift and effectively preventing spaces at the oblique planes 94, 94a from clogging with the dust.

Figure 5A:
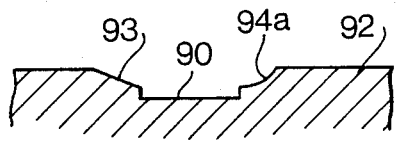
FIG. 5a is a part of a sectional view showing a part of a third embodiment of the spool.
Figure 5B:
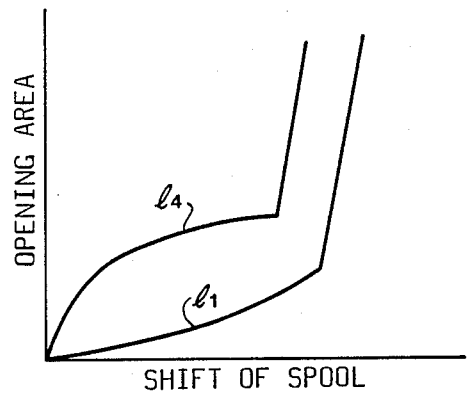

Referring to FIGS. 5a and 5b showing a further embodiment of the present invention, all of oblique planes consist of the indented oblique planes 94a. The characteristic thereof is shown by a line 14 in FIG. 5b. Thus, the transmission ratio changing rate at the start of the downshift further increases a little compared with the previous embodiment.

Figure 6A:
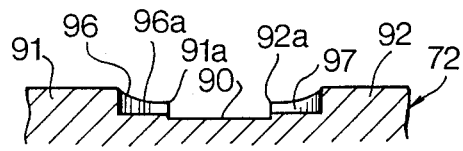
FIG. 6a is a part of a sectional view showing a fourth embodiment of the spool.
Figure 6B:
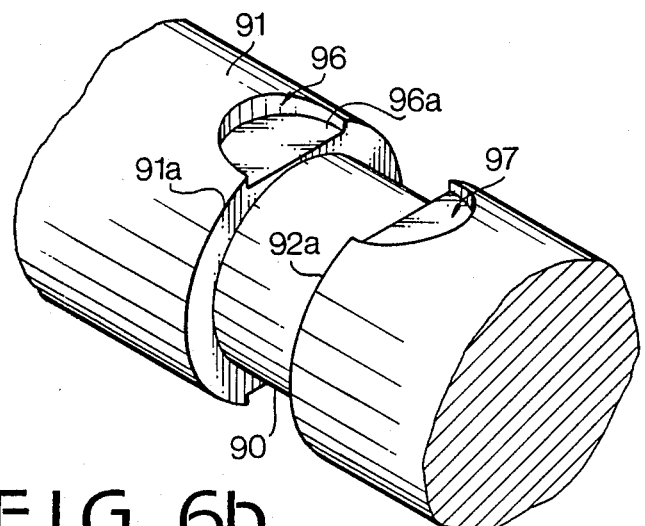
FIG. 6b is a perspective view showing a part of the spool of FIG. 6b.
Figure 6C:
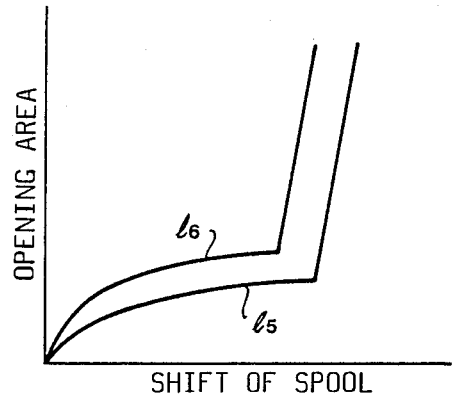

FIGS. 6a to 6c show a fourth embodiment. In the embodiment, each retracted peripheral portion is formed by cutting away the indented portion to form a deeply retracted recess having a bottom 96a which has a level close to the groove 90. On the edge 91a, two retracted portions 96 are provided. On the edge 92a, four retracted portions 97 are formed As shown in FIG. 6c, the characteristics of the retracted portions 96 and 97 are shown by a line 15 and a line 16, respectively. In this embodiment,, the transmission ratio changing rate further increases and entering of dust in the spaces is completely prevented.

From the foregoing, it will be understood that the present invention provides a transmission ratio control valve having a spool of simplified structure with a small size. Further, the spool has retracted peripheral portions partly formed on the circumferential edge portions, so that manufacturing process by cutting is easily performed with accuracy. It is possible to extremely reduce the changing rate of the port opening area, thereby the characteristic thereof is easily adjusted. Accordingly,,the transmission at the upshifting and downshifting is properly controlled.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed:

1. In a control valve for a continuously variable transmission having a drive pulley forming a hydraulic chamber for changing transmission ratio of the transmission dependent on pressure in the chamber, the valve comprising valve body means for providing a first port communicating with the chamber, a second port communicating with a pressure source to produce line pressure, and a third port communicating with a drain passage, spool means slidably disposed in the valve body means and having a first land to close the second port, a second land to close the third port, and an annular groove between the first and second lands selectably in dependency on the position of the spool means communicatable with both the first and second ports together to supply the line pressure to the chamber for upshifting the transmission, and, respectively, communicatable with both the first and third ports together to discharge pressure in the chamber, lower than the line pressure, to the drain passage for downshifting the transmission, and first and second circumferential edges formed on the first and second lands adjacent the annular groove, respectively, the improvement in the spool means comprising first hollow means angularly equidistantly formed in a peripheral direction on the first land between a peripheral surface and a perpendicular surface of the first land at the first circumferential edge, for equalizing transient pressure occurring at starting of communication of the annular groove and the second port, and for producing a first characteristic representing a small opening area changing rate of the second port with respect to shifting of the spool means, and second hollow means angularly equidistantly formed in a peripheral direction on the second land between a peripheral surface and a perpendicular surface of the second land at the second circumferential edge, for equalizing transient pressure occurring at starting of communication of the annular groove and the third port, and for producing a second characteristic representing an opening area changing rate of the third port with respect to shifting of the spool means larger than that of the first hollow means, so as to provided an appropriate transmission ratio changing rate at upshifting and downshifting, respectively, preventing clogging of the first and second hollow means with dust and chips.

2. The control valve according to claim 1, wherein the first and second hollow means constitute first and second oblique planes formed on said first and second lands respectively.

3. The control valve according to claim 2, wherein said first oblique planes forms a smaller angle with said axis than that of said second oblique planes.

4. The control valve according to claim 1, wherein at least some of the second hollow means constitute concavely indented surfaces formed on said second land.

5. The control valve according to claim 4, wherein other of said second hollow means alternate peripherally with said concavely indented surfaces and constitute oblique planes, and are formed on said second land, and said first hollow means constitutes oblique planes formed on said first land.

6. The control valve according to claim 4, wherein all of said second hollow means constitute said concavely indented surfaces, and said first hollow means constitutes oblique planes formed on said first land.

7. The control valve according to claim 1, wherein the first hollow means faces the second hollow means in same phase in peripheral direction on the spool means.

8. The control valve according to claim 1, wherein said first and second hollow means are formed as retracted peripheral portions on said first and second lands, respectively.

9. The control valve according to claim 8, wherein said retracted peripheral portions each forms a deeply retracted recess in said lands having a bottom at a level close to and substantially tangential to the level of a peripheral surface of said spool means forming said groove between said lands.

10. The control valve according to claim 1, wherein the number of said first hollow portions are different from the number of said second hollow portions.

* * * * *